July 23, 1957 W. L. CHAMBERS 2,800,164
SEAT-CANE
Filed March 31, 1953 2 Sheets-Sheet 2
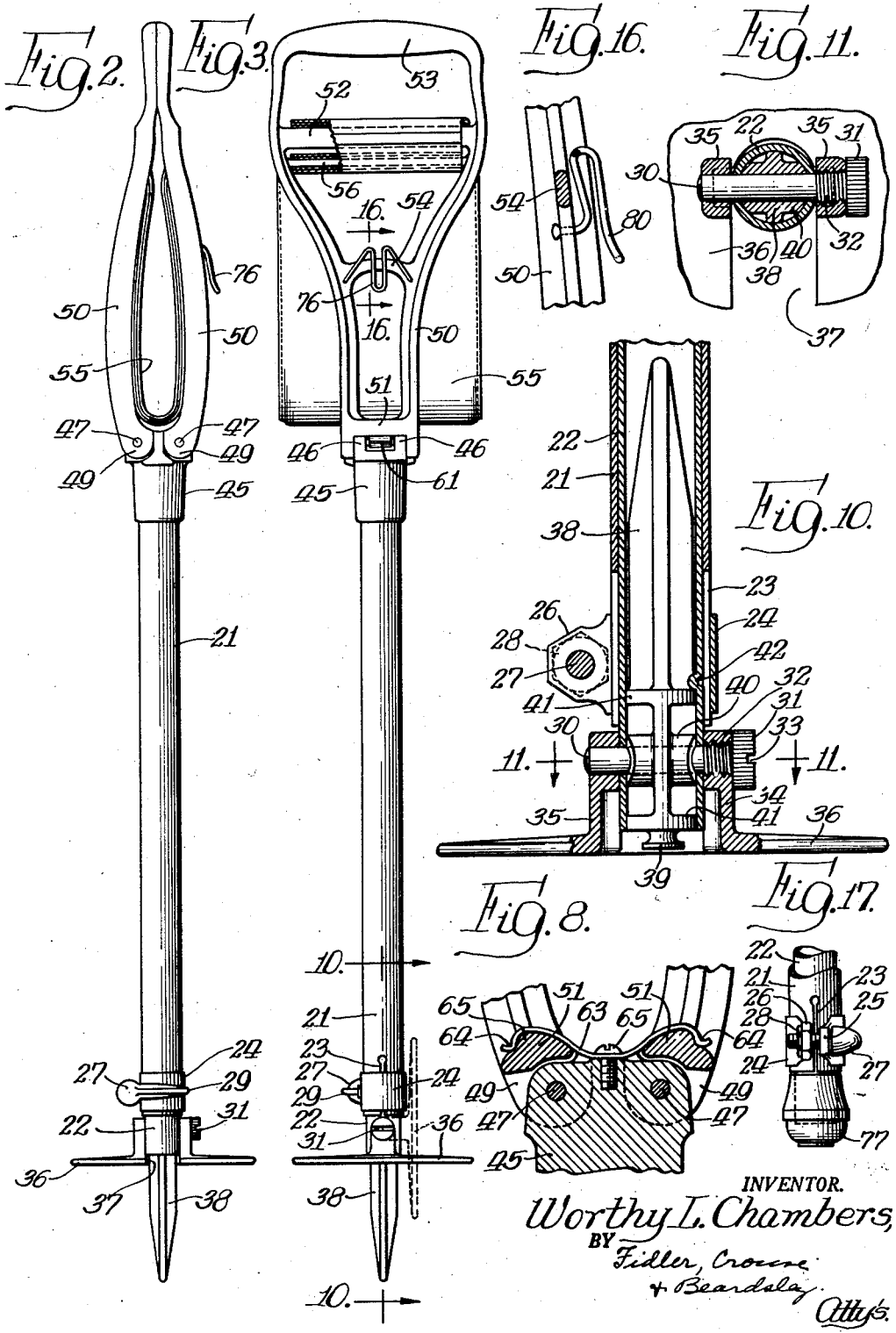
INVENTOR.
Worthy L. Chambers,
BY Fidler, Crouse
& Beardsley.
Attys.

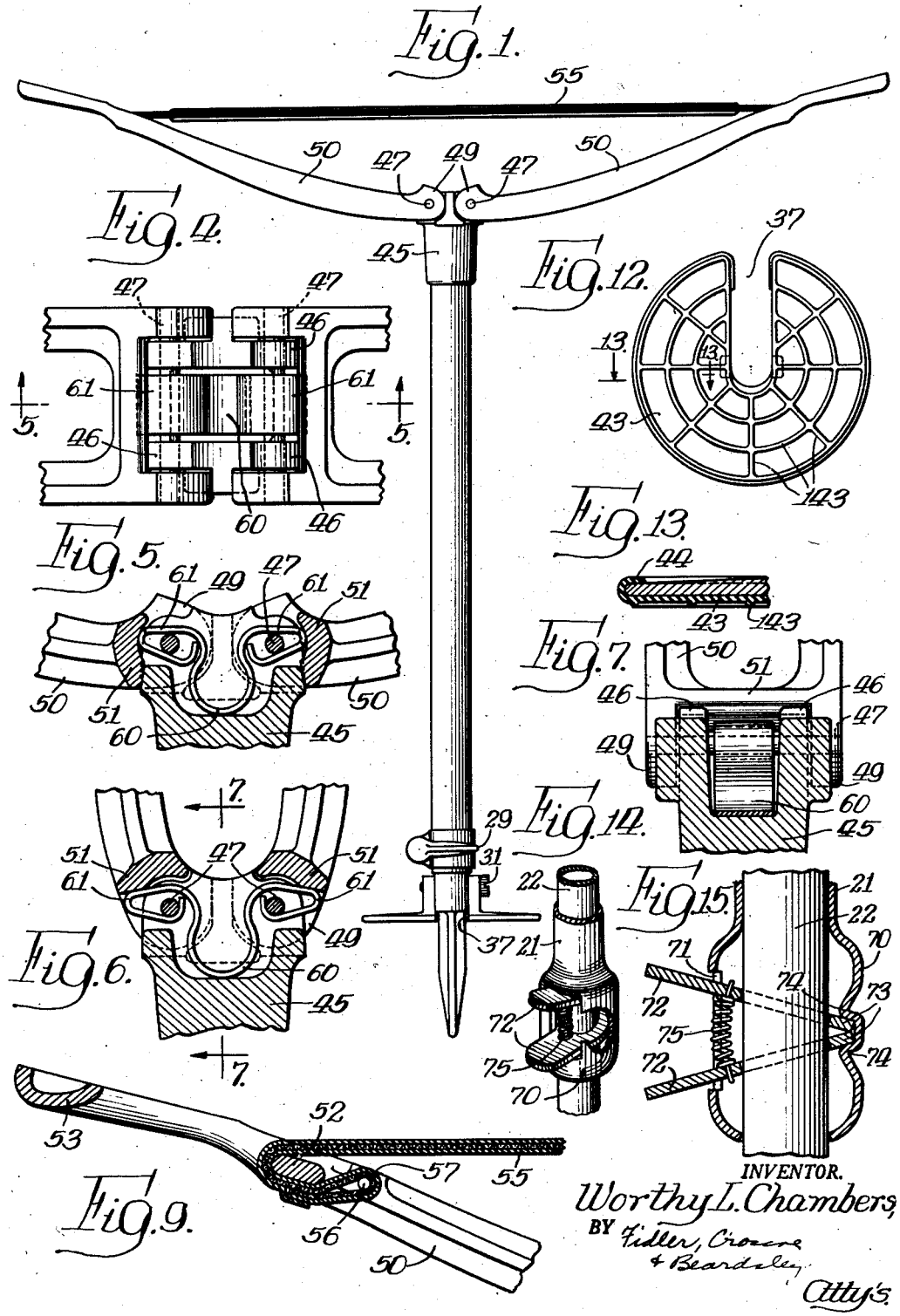

2,800,164
SEAT-CANE

Worthy L. Chambers, Chicago, Ill., assignor to National Die Casting Company, Chicago, Ill., a corporation of Illinois Application March 31, 1953, Serial No. 345,901

10 Claims. (Cl. 155—135)

This invention relates to improvements in seat canes.

An object of the invention is to provide a combination cane and foldable seat of strong and durable construction and relatively light weight.

A further object is to provide a combination cane and foldable seat which is most easily, quickly and conveniently transformable from carrying condition to condition for use as a seat in various circumstances, and back to carrying condition.

A further object is to provide a combination seat cane with improved ground engaging means easily and quickly adjustable for use on various surfaces or for convenient carrying.

A further object is to provide a seat cane in which the collapsible seat structure is most easily and quickly adjustable from carrying to seating condition and reversely with a minimum of manipulation and which is securely but very readily releasably retained in carrying condition.

A further object is to provide a seat cane having a very simply and easily operable but secure seat height adjustment.

The foregoing and other objects and advantages of the invention are more fully explained in the following description of the preferred embodiments illustrated in the accompanying drawings in which:

Fig. 1 is a side elevation of an improved seat cane in accordance with the invention and conditioned for use as a seat to be supported upon soft ground;

Fig. 2 is a further side elevation from the same viewpoint as in Fig. 1 but with the seat collapsed for carrying;

Fig. 3 is a further side elevation similar to Fig. 2 but with the seat cane rotated on its vertical axis through an angle of 90° from its position of Fig. 2;

Fig. 4 is a partial plan of the hinged connection between the halves of the seat frame and the head of the supporting column, the seat frame being in opened or seating condition as in Fig. 1;

Fig. 5 is a section in the plane 5—5 of Fig. 4;

Fig. 6 is a section similar to that of Fig. 5 but with the seat frame in closed or carrying condition;

Fig. 7 is a section in the plane 7—7 of Fig. 6;

Fig. 8 is a section similar to that of Fig. 6 but showing a modified form of latch;

Fig. 9 is a detail section showing the attachment of one end of the flexible seat member to one of the seat frame members;

Fig. 10 is a vertical section in the plane 10—10 of Fig. 3 but showing the ground spike in reversed and sheathed position for use of the seat upon floors, platforms or other hard surfaces;

Fig. 11 is a section in the plane 11—11 of Fig. 10;

Fig. 12 is a bottom plan of a readily removable and replaceable ground plate cover member to avoid slipping on or marking and marring of finished floors on which the seat may be used;

Fig. 13 is a partial section in the plane 13—13 of Fig. 12;

Fig. 14 is a perspective of a modified form of height adjustment clamp;

Fig. 15 is a vertical section through the clamp of Fig. 14;

Fig. 16 is a detail partial section in the plane 16—16 of Fig. 3; and

Fig. 17 is a partial side elevation showing a resilient tip element replacing the ground plate.

As shown in Figs. 1, 2, 3 and 10, the seat cane has a column or post comprising outer and inner telescoping metal tubes 21 and 22. The lower end of the outer tube 21 is formed with one or more short longitudinal slots 23 and is embraced by a slotted clamping ring 24 having on opposite sides of its slot a pair of apertured ears 25 and 26, adapted to be drawn together by a clamping screw 27 and nut 28. The ear 26 has on its outer face a socket of polygonal form and size corresponding to that of the clamp nut 28 to prevent turning of the latter as the clamp screw is rotated by means of a laterally extending finger portion 29 to tighten or loosen the clamp. Another advantage of this arrangement is that, the nut 28 may be placed in any one of a number of rotated positions, six for a hexagonal nut and socket, to permit the finger portion 29 of the clamp screw to be located in a convenient position when the screw has been fully tightened. With the clamp loosened the inner tubular member 22 may be withdrawn from or telescoped within the outer tubular member 21 to any desired position of height adjustment after which the clamp may be tightened by rotation of the screw 27 to contract the clamp ring 24 upon the lower slotted end of the outer member 21 and thereby contract the latter upon the inner tubular member 22 to hold the members 21 and 22 securely in adjusted relative position.

The lower end portion of the inner tubular member 22 is apertured to receive a pin 30 formed at one end with a knurled head 31. The pin 30 has a portion 32 of intermediate diameter screw threaded into an upstanding ear 34 of a ground plate 36 and also has a smooth cylindrical portion of smaller diameter extending through the apertures in the member 22 and into a fitting cylindrical bore in a second upstanding ear 35 of the ground plate 36. The head 31 of the pin 30 is also slotted as at 33 to receive the edge of a coin to facilitate tightening and loosening. The inwardly facing surfaces of the ears 34 and 35 surrounding the pin 30 frictionally embrace the tubular member 22 with sufficient pressure to retain the ground plate 36 in either the carrying position shown in dotted lines in Fig. 3 or in the ground engaging position shown in full lines but without preventing relatively easy movement of the ground plate from either position to the other.

A ground spike 38 of generally cruciform section and pointed at one end is formed at its opposite end with an undercut knob 39 or other finger grip element and, relatively near the latter end, with a transverse generally cylindrical enlargement 40 through which runs a bore fitting the pin 30. The ground spike is also formed above and below the enlargement 40 with circular webs 41 closely fitting against the inner surfaces of the inner tubular member 22. By removing the pin 30 the ground spike 38 may easily be removed from the inner tubular member 22 and reinserted therein with either the pointed end extended considerably below the lower surface of the ground plate 36 as in Figs. 1, 2 and 3, or in the position of Fig. 10 where the ground spike is substantially completely sheathed within the inner tubular member 22 and entirely above the lower ground engaging face of the ground plate 36, thereby adapting the seat cane for use upon various ground or floor surfaces. The inner tubular member 22 is formed with an inwardly projecting dimple 42 to engage one of the other of the webs 41 to prevent the spike 38 from slipping beyond reach within the tube 22 and to aid in aligning the bore in the enlargement 40 with the apertures in the tube 22. The otherwise circular base portion of the ground plate 36 is formed with a slot 37 (Fig. 12) to pass the ground spike 38 when the latter is in the extended position of Figs. 1, 2 and 3 as the ground plate 36 is tilted about the pin 30 from its full line position to its dotted line position of Fig. 3, or reversely.

A cover pad 43 (Figs. 12 and 13), formed with an upwardly and inwardly extending peripheral flange 44 and adapted to completely cover the ground engaging face of the ground plate 36, is formed of molded rubber or synthetic flexible and resilient material permitting it to be readily removed from or returned to self-sustaining position on the ground plate. The lower or outer face of the pad 43 may be formed with a suitable anti-slip tread pattern, such as the ridges or ribs 143 shown in Fig. 12. With the cover pad 43 placed upon the ground plate 36 and covering the ground engaging face thereof, the seat cane may be safely used upon finished floors without risk of slipping or of scratching or marring the finish. Because of the resiliency of the material of which it is formed, the ground plate cover may easily and quickly be removed from the ground plate and conveniently carried in a pocket to prevent it from picking up soil, grit or gravel when the seat cane is used out of doors.

A seat supporting head 45 is formed with a downwardly opening socket portion fitted on the upper end of the outer tubular member 21, and on its upper portion with two vertical flanges 46 having aligned pairs of bores supporting a pair of hinge pins 47 each extending outwardly into bores formed through ears 49 in a respective one of two seat frame halves 50 which may be of identical form. Each seat frame half is formed as an open frame, narrower adjacent its hinge end and widened adjacent its opposite end, and having a plurality of cross members including one, 51, adjacent the hinge ears 49 and a second one, 52 a little distance inwardly from the opposite handle portions 53 and, preferably, also additional strengthening cross elements 54.

A flexible seat member 55 in the form of a long, wide strap is formed of a plurality of plies of any desired flexible material such as leather, synthetic plastic sheet, textile webbing or the like, at least one of which is of suitable strength. The seat member 55 is secured to the respective seat frame halves by turning its end portions over and around the cross elements 52, passing a rod 56 (Figs. 3 and 9) through closed loops in the ends of the seat member 55, and then fitting the ends of the rods 56 in sockets or slots 57 which are formed in the sides of the seat frames. The open ends of the slots or sockets 57 are so located in relation to the closed ends that pull exerted on the rods 56 by tensioning of the seat element 55 is in a direction substantially toward the closed ends of the slots and prevents accidental detachment of the seat member 55 from the seat frame. When the seat frame halves are swung on the pivot pins 47 to the open seating position of Figure 1, the seat member 55 is tautly extended as shown in that figure whereas, when the seat frame halves are brought together (Fig. 2) the seat element 55 folds downwardly between the seat frame halves and the end portions 53 of the seat frame halves together form a convenient handle for carrying the device as a cane. The mode of securement of the seat element 55 on the seat frame by means of the rods 56 permits of easy and ready removability of the seat element 55 when desired for cleaning, repairing or replacement.

When the seat frame halves are moved to the vertical position of Figs. 2 and 3 for carrying the device as a cane, the seat frame halves are readily releasably held in such closed position by a latch spring 60 (Figs. 4, 5 and 6) which is formed of a strip or ribbon of spring metal with a central portion of generally U-form and end portions in the form of substantially closed loops 61 elongated outwardly away from each other and surrounding the central portions of the pivot pins 47. When the seat frame halves are in the closed positions of Figs. 2, 3 and 6, the outer ends of the loop portions 61 of the spring 60 are positioned outwardly under the outer lower edges of the cross elements 51 of the seat frame halves, and exert sufficient pressure thereon to yieldingly hold the handle portions 53 of the two seat frame halves together as shown in Fig. 2. When the handle portions 53 are pulled apart the outer ends of the loop portions 61 of the spring 60 are first flexed downwardly somewhat and then are cammed inwardly to the position of Fig. 5 as the seat frame halves are swung apart toward the position of Figs. 1 and 5.

A modified form of latch spring 63 is shown in Fig. 8. The spring 63 is also formed of a strip or ribbon of spring metal apertured at its center for securement to the member 45 by a screw. The opposite outer end portions of the spring 63 are curved downwardly and outwardly to provide detent portions 64 adapted, when the seat frame halves are in the closed carrying position of Fig. 2 to engage behind detent shoulders 65 on the outer upper surfaces of the cross elements 51 to readily releasably retain the seat frame halves in closed position. With either form of spring 60 or 63 the seat may be opened or closed by direct manual movement of the seat frame halves apart or together without any direct manipulation of the spring latch.

The height of the seat and length of the cane are simply, easily and securely adjustable either by means of the previously described clamp shown in Figs. 1, 2, 3, 10 and 17 or by means of an alternative form of clamp shown in Fig. 15.

As shown in Fig. 15, the outer tubular member 21 may be expanded or enlarged adjacent its lower end as at 70. The enlarged portion 70 is formed on one side with an aperture 71 to pass finger pieces 72 of a pair of apertured cramping latch plates 73 which surround the inner tubular member 22 within the enlargement 70 of the outer tubular member. The latch plates 73 are seated close together at their sides opposite the finger pieces 72 in a pocket formed between inwardly bent portions 74 of the enlargement 70. The plates 73 are normally held apart at their sides adjacent the finger pieces 72 and in effective frictional engagement with the inner tubular member 22 by means of a coiled compression spring 75 positioned between the plates 73 just within the aperture 71 and having its axially directed ends held in small apertures in the plates 73. Any force applied to effect relative axial movement of the members 21 and 22 normally tends to move one or the other of the cramping latch plates 73 to a more inclined position to cause it to more tightly hold the inner member 22 against movement relative to the outer member 21, but after simply moving the finger pieces 72 slightly toward each other, the cramping latch plates 73 are released from the inner member 22 to permit easy movement of the latter relative to the outer member 21 to any desired position of adjustment after which, upon release of finger pressure from the finger portions 72, the spring 75 will return the plates 73 to latching position to hold the members 21 and 22 securely in their relatively adjusted positions.

By simply unscrewing and withdrawing the pin 30, the ground plate 36 may readily be removed, after which a small tip member 77 similar in form to a crutch tip or chair leg tip and formed of any suitable non-skid and/or non-marking material such as rubber or synthetic plastic may be placed on the lower end of the inner member 22 and frictionally held thereon.

A small spring wire clip 80 (Figs. 3 and 16), having a downwardly extending U-bent central portion between outwardly and downwardly diverging portions having their transversely bent ends suitably secured in one of the seat frame halves 50 adjacent the cross element 54, serves both as a convenient hook by which the seat cane may be carried from a belt and as a clip to hold small articles, such as cards or gloves.

The above described seat cane is of light weight and simple but strong and durable construction. It is also extremely easily and readily adjustable for convenient carrying as a cane or attached to an apparel belt, or for use as a seat on various ground or floor surfaces, and very easily and securely adjustable as to cane-length and seat height.

I claim:

1. A seat cane having a seat supporting column and a folding seat structure supported on the upper end of said column, said seat structure comprising a pair of seat frame halves, means on the upper end of said column hingedly connected with one end of each of said frame halves, each of said frame halves having spaced side elements and a plurality of transverse connecting elements extending between and having their ends connected with said side elements and including a seat-supporting transverse element extending between and connecting said side elements relatively remotely from said hinged connection, a flexible seat member having each end portion wrapped over, outwardly around and under the said transverse element of a respective one of the seat frame halves and terminating in a closed loop, and a pair of rods each extending through a respective one of the end loops of said seat member, said spaced side elements of each seat frame half having sockets seating the ends of one of said rods and formed to permit removal of the rod ends therefrom only in a direction away from said seat-supporting transverse element of the respective frame half and counter to pull exerted on said rod by said seat member when the latter is tensioned by weight supported by it.

2. A seat cane having a seat supporting column and a folding seat structure supported on the upper end of said column, said seat structure comprising a pair of seat frame halves, each of said seat frame halves comprising an elongated substantially loop-like frame element, means on the upper end of said column providing a hinged connection with one end of each of said loop-like frame members to permit swinging of said frame halves from spread seating positions to mutually adjacent positions in substantial longitudinal alignment with said column and reversely, in which latter position of the frame halves the portions of said loop-like frame elements together form a handle, and a spring member attached to said hinged connection means and cooperating with portions of said seat frame halves to releasably retain said seat frame halves in said latter position.

3. A seat cane according to claim 2, wherein said hinged connection means comprises hinge pin supporting means on the upper end of said column and hinge pins carried thereby and extending through portions of said loop-like frame elements, each of said seat frame halves having a transverse frame element extending between and connecting the sides of said loop-like frame element near to the respective hinge pins, and said spring member being in the form of a strip of spring material with a U-shaped mid portion and adjoining substantially closed, oppositely extending, elongated loop portions encircling the respective hinge pins with their outward ends extending under and pressing against said transverse frame elements when the frame halves are in said mutually adjacent positions but adapted to be yieldingly cammed toward each other by said transverse elements as the frame halves are swung apart toward said spread positions.

4. A seat cane according to claim 2, wherein said hinged connection means comprises hinge-pin supporting means on the upper end of said column and hinge-pins carried thereby and extending through portions of said loop-like frame elements, each of said seat frame halves having a transverse frame element extending between and connecting the sides of said loop-like frame element near to the respective hinge-pins and having a detent formation thereon, and said spring member being in the form of a strip of spring material secured intermediate its ends to said hinge-pin supporting means and having detent portions to cooperate with the detent formations of the respective transverse frame elements to releasably retain the frame halves in said mutually adjacent positions after they have been moved thereto but adapted to be yieldingly cammed out of retaining engagement with said detent formations of said transverse elements as the frame halves are swung apart toward said spread positions.

5. A seat cane having a seat supporting column comprising inner and outer telescoping tubular members, a foldable seat-supporting structure secured on one end of one of said tubular members, ground engaging means on the opposite end of the other of said tubular members, the other end portion of the outer tubular member being longitudinally slotted, and means for releasably securing said tubular members in longitudinally adjusted position relative to each other, said securing means comprising a clamping ring surrounding the slotted end portion of said outer tubular member, having a slot extending through said ring on one side, and having portions adjacent said slot on each side thereof and formed with aligned apertures, a clamping screw extending through said apertures and having a head with a finger-grip portion on one end, a nut threaded on the other end of said clamping screw, and means on one of said portions of said ring to hold said nut against rotation with said screw as the latter is rotated to tighten or loosen said clamping ring.

6. A seat cane having a seat supporting column comprising inner and outer telescoping tubular members, a foldable seat-supporting structure secured on one end of one of said tubular members, ground-engaging means on the opposite end of the other of said tubular members, the other end portion of the outer tubular member having an enlargement of internal diameter substantially greater than the outer diameter of the inner tubular member, and the wall of said enlargement having an aperture through one side thereof and a pair of axially spaced inward projections on the side opposite said aperture, and means for releasably securing said tubular members in longitudinally adjusted position relative to each other, said securing means comprising a pair of substantially flat annular plates surrounding the inner tubular member within said enlarged portion of said outer tubular member and both seated at one side between said inward projections, and a spring compressed between said plates at the side opposite said inward projections and adjacent said aperture and yieldingly spreading said plates apart at the latter side, said plates each having a finger piece extending from the latter side thereof through said aperture.

7. A seat cane comprising a tubular seat supporting column, a foldable seat structure supported on said column at one end thereof, the other end portion of said tubular column having a pair of transversely oppositely aligned apertures therethrough, a separate ground spike having a head portion of substantial length and transversely dimensioned to fit closely within the interior of said other end portion of said column and having, intermediate its ends, a bore extending transversely therethrough and adapted to register at its ends with said apertures, said spike also having a ground penetrating portion of substantial axial length extending from one end of said head portion and transversely dimensioned for easy insertion within said tubular column, a single removable securing pin extending through said bore and apertures to secure said spike in said other end of said column, said bore and apertures being so located on the column and the ground spike being so proportioned that when the ground spike is in a first position with its ground engaging portion extended into the column the spike is enclosed therein except for a very small portion and when in a second and inverted position the ground penetrating portion projects substantially entirely out of the column, a ground plate member with a ground engaging face and spaced portions extending transversely of and in the direction opposite from said ground engaging face, embracing between them said other end portion of said column, and having openings therethrough registering with said apertures and receiving said pin for pivotally mounting the ground plate member, said ground plate member having a passageway extending from a central portion to and through an outer edge and normal to the axis of said pin receiving said ground spike and of greater width than the diameter of the ground spike and accommodating the pivotal movements of the plate member, the ground plate member being so dimensioned that when it is in position transverse to the longitudinal axis of the column, and the ground spike is in its said second position, the ground engaging face of the plate member is spaced from the free end of the ground penetrating portion of the spike.

8. A seat cane according to claim 7, wherein said pin and one of said ground plate member portions are formed with coacting portions for readily releasably securing said pin in said portion, said pin also having a finger grip portion on one end.

9. A seat cane according to claim 7, wherein the head portion of said spike, at its end opposite said ground penetrating portion, has a finger grip portion constituting the sole portion of said spike positioned exteriorly of said column while said ground penetrating and head portions are positioned within said column, said ground plate member being so dimensioned that when it is in its said transverse position its ground engaging face is spaced beyond the end of the column and the ground plate member encompasses said finger grip portion.

10. A seat cane according to claim 7, having a cover formed of a material of rubber-like resiliency covering said ground engaging face of said ground plate member and having a marginal portion extending around and over the periphery of said ground plate member to releasably retain said cover on said member, said cover having a slot registering with the passageway of the ground plate member and its marginal portion including portions overlying at least part of the side walls defining the passageway.

References Cited in the file of this patent
UNITED STATES PATENTS

| | | |
|---|---|---|
| 887,663 | Lee | May 12, 1908 |
| 1,435,627 | Uhl | Nov. 14, 1922 |
| 1,895,115 | Williams | Jan. 24, 1933 |
| 1,997,142 | Hanson | Apr. 9, 1935 |
| 2,064,215 | Noe | Dec. 15, 1936 |
| 2,137,799 | Brandenburg | Nov. 22, 1938 |
| 2,582,864 | Gittings et al. | Jan. 15, 1952 |
| 2,609,033 | Finke | Sept. 2, 1952 |

FOREIGN PATENTS

| | | |
|---|---|---|
| 216,302 | Great Britain | May 29, 1924 |
| 242,419 | Great Britain | Nov. 12, 1925 |
| 279,334 | Great Britain | Oct. 27, 1927 |
| 599,663 | Great Britain | Mar. 17, 1948 |
| 751,986 | France | July 3, 1933 |